F. R. PARKER.
RELAY.
APPLICATION FILED MAR. 18, 1920.
Reissued June 6, 1922.
15,374.
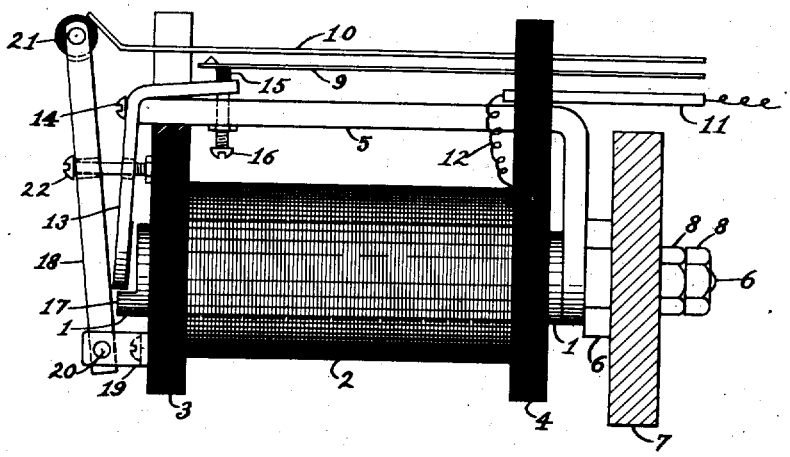
WITNESSES:
Frances K. Parker.
Otto Kischel.
INVENTOR:
Frederick R. Parker

UNITED STATES PATENT OFFICE.

FREDERICK R. PARKER, OF CHICAGO, ILLINOIS.

RELAY.

15,374. Specification of Reissued Letters Patent. Reissued June 6, 1922.

Original application filed February 19, 1904, Serial No. 194,392. Divided and application filed May 29, 1914, Serial No. 841,729. Patented May 15, 1917, No. 1,226,617. Original No. 1,259,901, dated March 19, 1918. Application for reissue filed March 18, 1920. Serial No. 366,971.

*To all whom it may concern:*

Be it known that I, FREDERICK R. PARKER, a citizen of the United States of America, residing at Chicago, in the county of Cook and State of Illinois, have invented a new and useful Relay, of which the following is a specification, reference being had to the accompanying drawing illustrating same.

This application is a division of my application from which United States Letters Patent No. 1,226,617 issued on May 15, 1917, on electromagnet.

My present invention relates to that class of electrically-operable devices known as relays.

The principal objects of my invention are, to provide an improved relay or electrically-operable device substantially as herein set forth; to provide improved switching mechanism for such relays or electrically-operable devices; and to provide improved means for operating the switching mechanism of such relays or electrically-operable devices.

Other objects will be apparent from the following specification.

The figure of the drawing is a side elevation of one preferred construction of my improved relay, showing the relay mounted to a mounting strip. In the figure a portion of one of the insulating spool heads is shown broken away to show the apparatus more clearly.

Referring to the drawing, 1 is a magnetizable core upon which an energizing coil 2 is wound. 3 and 4 are heads of insulating material which are forced onto the core 1 and form therewith a spool for containing the winding 2. 5 is an L-shaped member of magnetizable material which is attached to the rear end of the core 1 preferably by a bolt 6 extending into the rear end of the core 1. One leg of the member 5 extends substantially parallel with the core 1 between the spool heads 3 and 4, preferably as shown, and is attached to the heads 3 and 4 in any suitable manner. 7 is a mounting strip intended for mounting a number of relays thereon. The relay of the figure is held to the strip 7 preferably by nuts 8 8. 9 and 10 are switch springs which are preferably carried by the head portion 4. The springs 9 and 10 are insulated from each other in any suitable manner. 11 is one of a pair of terminals for the ends of the winding 2, which are extended through the head portion 4 and carried thereby. The end 12 of the winding 2 may be attached to the terminal 11 as shown, preferably being soldered thereto. 13 is an armature which is preferably made of comparatively thin magnetizable material and mounted pivotally to the free end of the L-shaped member 5 preferably by a screw 14. The upper or inner end of the armature 13 preferably carries a pin 15 of insulating material adapted to bear against the switch spring 9 and operate it when the armature 13 is operated. 16 is an adjustment screw for limiting the backward movement of the armature 13. The front end of the core 1 is preferably cut out as shown to accommodate the armature 13 and provide a portion 17 extending forwardly to within a short distance from a second armature 18. The armature 18 is preferably made of comparatively thick magnetizable material and is pivotally mounted at 20 between or on brackets 19 which are attached to the spool head 3. The armature 18 preferably overlaps the armature 13 and preferably carries an insulating roller 21 at its free end adapted to bear against the switch spring 10 and operate it when the armature 18 is operated. 22 is an adjustment screw for limiting the backward movement of the armature 18. Any other details of construction of the device are thought to be well understood without further description.

As to the operation of the relay, when a small energizing current of the proper intensity is sent through the coil 2, the magnetic circuit 1 5 13 becomes sufficiently magnetized to cause the core 1 to attract the armature 13 thereto, thus operating the spring 9 and causing it to engage the spring 10. The armature 18, however, will not be attracted by the magnetism produced by this weak energizing current. When a larger energizing current of the proper intensity is sent through the coil 2, the magnetizable portions 1 5 13 18 become sufficiently magnetized to cause the attraction of both of the armatures 13 and 18 toward the core 1, provided the armature 13 was not already attracted by a weaker energization of the device, in which latter case the armature 18 alone will be attracted by the increased energization. The attraction of armature 18 operates the spring 10 and either takes it out of contact with spring 9 which was previously operated, or keeps the contact 9 10 open in case both of the armatures are operated simultaneously. The armature 18 when attracted therefore opens the switch 9 10 or else maintains it in open condition.

When a small energizing current is first turned on through the winding 2 and is then increased sufficiently, the armature 13 first closes the switch 9 10 and then the armature 18 opens the same switch. Reversely, when there is a large energizing current passing through the winding 2 and it is then reduced sufficiently, the armature 18 first closes the switch 9 10 and then the armature 13 opens the same switch, this latter operation preferably taking place when the energizing current is reduced close to zero. I may utilize these operations of the armatures and their control of the switch in certain places to great advantage, as, for instance, in telephone systems, for various purposes including the control of signaling devices and especially supervisory signaling devices. The backward operations of the armatures 13 and 18 may be caused by the pressure of the springs 9 and 10 thereon, or by gravity, or both.

I desire it to be understood that I may control a great number of combinations of switch springs or members by means of the armatures of my relay, and I therefore do not wish to be limited in this invention to the particular switch shown.

I also wish it to be understood that in certain modifications of my invention I may use any number of coils or windings on the core 1 for magnetizing same.

While the construction of the relay herein shown provides a very sensitive and efficient device, I do not wish to be limited in this invention to the particular construction shown, as various modifications thereof may be made or utilized without departing from the scope of the appended claims.

The electromagnet structure of the preferred form of relay of this invention forms the subject matter of my United States Letters Patent No. 1,226,617, dated May 15, 1917, of which this present application is a division.

Certain forms of the relay of this invention form the subject matter of my co-pending application Serial No. 160,599, filed April 9, 1917, on relay.

A modified form of the relay of this invention is disclosed in my co-pending application Serial No. 841,730, filed May 29, 1914, on electromagnet.

One form of relay of this invention is utilized in and claimed in connection with the telephone system of my United States Letters Patent No. 1,103,909, dated July 14, 1914.

A modified form of the relay of this invention is utilized in and claimed in connection with the telephone system of my United States Letters Patent No. 767,953, dated Aug. 16, 1904.

Another modified form of the relay of this invention is utilized in and claimed in connection with the telephone system of my United States Letters Patent No. 1,090,821, dated March 17, 1914.

What I claim as my invention is:

1. In a relay device, a single electromagnet structure and a plurality of armatures therefor forming a substantially closed magnetic circuit under energized conditions, a switch, each of the armatures being mechanically associated with the switch for controlling same, and means whereby different degrees of energization of the relay device operate the armatures separately.

2. In a relay device, a single electromagnet structure and armature mechanism therefor forming a substantially closed magnetic circuit under energized conditions, a switch, a plurality of armature-controlled mechanisms each mechanically associated with the switch for controlling same, and means whereby different degrees of energization of the relay device operate the said armature-controlled mechanisms separately.

3. In a relay device, a single electromagnet structure and a plurality of armatures therefor forming a substantially closed magnetic circuit under energized conditions, a switch, each of the armatures having means for opening and closing the switch, and means whereby different degrees of energization of the relay device operate the armatures separately.

4. In a relay device, a single electromagnet structure and armature mechanism therefor forming a substantially closed magnetic circuit under energized conditions, a switch, a plurality of armature-controlled mechanisms each having means for opening and closing the switch, and means whereby different degrees of energization of the relay device operate the said armature-controlled mechanisms separately.

5. In a relay device having a magnetic structure and switching mechanism, means for controlling the switching mechanism comprising a plurality of overlapping armatures oppositely pivoted adjacent the respective poles of the magnetic structure.

6. In a relay device having switching mechanism and a magnetic structure comprising but a single core and an L-shaped member connected to one end of the core, means for controlling the switching mechanism comprising a plurality of armatures at least one of which is operably associated with the said L-shaped member, the said armatures requiring respective degrees of energization of the device to effect their operation separately.

7. In a relay device having switching mechanism and a magnetic structure comprising a core and an L-shaped member connected to one end of the core, means for controlling the switching mechanism comprising two armatures one of which is operably attached to the said L-shaped member, the other armature being pivoted on the opposite side of the core from the said L-shaped member, the said armatures requiring respective degrees of energization of the device to effect their attraction separately.

8. In a relay device, a single electromagnet structure and a plurality of armatures therefor forming a substantially closed magnetic circuit under energized conditions, a switch comprising a pair of switch members mounted for stationary engagement with each other, the said armatures being normally in unenergized positions and each mechanically associated with the switch for controlling same, and means for utilizing different energizations of the electromagnet structure for exercising different controls over the armatures.

9. In a relay device, a single electromagnet structure and armature mechanism therefor forming a substantially closed magnetic circuit under energized conditions, a switch comprising a pair of switch members mounted for stationary engagement with each other, a plurality of armature-controlled mechanisms each mechanically associated with the switch for controlling same, and means for utilizing different energizations of the said electromagnet structure for exercising different controls over the said armature-controlled mechanisms.

10. In a relay device, a single electromagnet structure and a plurality of armatures therefor forming a substantially closed magnetic circuit under energized conditions, a switch comprising a plurality of switch members, the said armatures having means for operating the respective switch members to control the switch, and means for utilizing different energizations of the electromagnet structure for exercising different controls over the armatures.

11. In a relay device, a single electromagnet structure and a pair of armatures therefor forming a substantially closed magnetic circuit under energized conditions, a switch comprising a pair of switch members, the said armatures having means for operating the respective switch members to control the switch, each armature depending on the position of the other armature for its control of the switch, and means for utilizing different energizations of the electromagnet structure for exercising different controls over the armature.

12. In a relay device, a single electromagnet structure and a pair of armatures therefor forming a substantially closed magnetic circuit under energized conditions, a switch comprising a pair of switch members, the said armatures having means for operating the respective switch members to control the switch, one armature depending on the position of the other armature for its control of the switch, and means for utilizing different energizations of the electromagnet structure for exercising different controls over the armatures.

13. In a relay device, a single electromagnet structure and a plurality of armatures therefor forming a substantially closed magnetic circuit under energized conditions, a switch, each of the armatures having means for mechanically controlling the switch, one of the said armatures depending on the energized maintenance of another of the said armatures in an actuated position for its control of the switch, and means for utilizing different energizations of the electromagnet structure for exercising different controls over the armatures.

14. In a relay device, a single electromagnet structure and armature mechanism therefor forming a substantially closed magnetic circuit under energized conditions, a switch, a plurality of armature-controlled mechanisms each having mechanical co-operation with the switch for controlling same whereby one of the said armature-controlled mechanisms depends on the energized maintenance of another of the said armature-controlled mechanisms in a certain position for its control of the switch, and means for utilizing different energizations of the said electromagnet structure for exercising different controls over the said armature-controlled mechanisms.

15. In a relay device, a single electromagnet structure and a plurality of armatures therefor forming a substantially closed magnetic circuit under energized conditions, a switch, each of the armatures having means mechanically co-operating with the switch for controlling same whereby one of the said armatures operates the switch while another of the said armatures is maintained in an actuated position, and means for utilizing different energizations of the electromagnet structure for exercising different controls over the armatures.

16. In a relay device, a single electromagnet structure and a plurality of armatures therefor forming a substantially closed magnetic circuit under energized conditions, a switch, each of the armatures having means mechanically co-operating with the switch for controlling same whereby one of the said armatures opens the switch only while another of the said armatures is in an actuated position, and means for utilizing different energizations of the electromagnet structure for exercising different controls over the armatures.

17. In a relay device, a single electromagnet structure and a plurality of armatures therefor forming a substantially closed magnetic circuit under energized conditions, a switch, each of the armatures having means for controlling the switch whereby one of the said armatures opens and closes the switch while another of the said armatures is in an actuated position, and means for utilizing different energizations of the electromagnet structure for exercising different controls over the armatures.

18. In a relay device, a single electromagnet structure and a plurality of armatures therefor forming a substantially closed magnetic circuit under energized conditions, a switch, each of the armatures having means for controlling the switch whereby one of the said armatures opens and closes the switch only while another of the said armatures is in an actuated position, and means for utilizing different energizations of the electromagnet structure for exercising different controls over the armatures.

19. In a relay device, a single electromagnet structure and a plurality of armatures therefor forming a substantially closed magnetic circuit under energized conditions, a pair of switch members co-operating with each other to provide an openable and closable switch contact, the said armatures being operable separately and acting conjointly to control the said contact, the said armatures having means for operating the respective said switch members, and means for utilizing different energizations of the electromagnet structure to operate the armatures separately.

20. In a relay device, a single electromagnet structure and a plurality of armatures therefor forming a substantially closed magnetic circuit under energized conditions, a pair of switch members co-operating with each other to provide an openable and closable switch contact, the said armatures being operable separately and acting conjointly to control the said contact, the said armatures having means for operating the respective said switch members both when attracted and released, and means for utilizing different energizations of the electromagnet structure to operate the armatures separately.

21. In an electromagnetic device, a single electromagnet structure and armature mechanism therefor forming a substantially closed magnetic circuit under energized conditions, a pair of switch members co-operating with each other to provide an openable and closable switch contact, a plurality of armature-controlled mechanisms operable separately and acting conjointly to control the said contact, the said armature-controlled mechanisms having means for operating the respective said switch members, and means for utilizing different energizations of the said electromagnet structure to operate the said armature-controlled mechanisms separately.

22. In an electromagnetic device, a single electromagnet structure and armature mechanism therefor forming a substantially closed magnetic circuit under energized conditions, a pair of switch members co-operating with each other to provide an openable and closable switch contact, a plurality of armature-controlled mechanisms operable separately and acting conjointly to control the said contact, the said armature-controlled mechanisms having means for operating the respective said switch members both when operated by an energization of the said electromagnet structure and by a de-energization of same, and means for utilizing different energizations of the said electromagnet structure to operate the said armature-controlled mechanisms separately.

23. In a relay device, a single electromagnet structure and a plurality of armatures therefor forming a substantially closed magnetic circuit under energized conditions, a switch comprising a pair of switch members mounted for stationary engagement with each other, each of the armatures having means for controlling the opening and closing movement of the switch, and means for utilizing different energizations of the electromagnet structure for exercising different controls over the armatures.

24. In a relay device, a single electromagnet structure and armature mechanism therefor forming a substantially closed magnetic circuit under energized conditions, a switch comprising a pair of switch members mounted for stationary engagement with each other, a plurality of armature-controlled mechanisms each having means for controlling the opening and closing movement of the switch, and means for utilizing different energizations of the said electromagnet structure for exercising different controls over the said armature-controlled mechanisms.

25. In a relay device, a single electromagnet structure and operable mechanism therefor forming a substantially closed magnetic circuit under energized conditions, a switch comprising a pair of switch members mounted for stationary engagement with each other, the said operable mechanism having means for mechanically controlling the switch, and means for causing the said operable mechanism to assume two operative positions out of normal position, upon the proper energization of the said electromagnet structure, to control the said switch in different manners.

26. In a relay device, a single electromagnet structure and operable mechanism therefor forming a substantially closed magnetic circuit under energized conditions, a switch comprising a pair of switch members mounted for stationary engagement with each other, the said operable mechanism having means for controlling the switch, and means for partially actuating the said mechanisms from normal position at one time and completely actuating it from normal position at another time, upon the proper energization of the said electromagnet structure, to control the said switch in different manners.

27. In a relay device, a single electromagnet structure and a pair of armatures therefor forming a substantially closed magnetic circuit under energized conditions, a switch, each of the armatures having means mechanically co-operating with the switch for controlling same whereby each armature depends on the position of the other armature for its control of the switch, and means for utilizing different energizations of the electromagnet structure for exercising different controls over the armatures.

28. In a relay device, a single electromagnet structure and a plurality of armatures therefor forming a substantially closed magnetic circuit under energized conditions, a switch, each of the armatures having means mechanically co-operating with the switch for controlling same whereby one of the said armatures opens the switch while another of the said armatures is in an actuated position, and means for utilizing different energizations of the electromagnet structure for exercising different controls over the armatures.

29. A relay comprising a core and means for energizing the same, a pair of armatures mounted adjacent to said core, one of said armatures presenting to said core a magnetizable area of greater extent than the other, and switch springs controllable by said armatures.

30. A relay having but a single core and means for energizing the same, a plurality of armatures mounted adjacent to said core, one of said armatures presenting to said core a magnetizable area of greater extent than another, and switching mechanism under the control of at least one of the said armatures.

31. A relay having but a single core and means for energizing the same, a pair of armatures mounted to be attracted by one end only of the core, one of the said armatures presenting for attraction by the core a mgnetizable area of greater extent than the other, and switching mechanism under the control of at least one of the said armatures.

32. In a relay having a core and means for energizing the same, two overlapping armatures adapted and arranged to be attracted by the end surface of one end of the core, the said end of the core having a portion thereof cut away on one side thereof for accommodating one of the armatures whereby different portions of the end surface of the said end of the core are in close proximity to the respective armatures for attracting them, and switching mechanism under the control of at least one of the said armatures.

33. In a relay device, a single electromagnet structure and a plurality of armatures therefor forming a substantially closed magnetic circuit under energized conditions, a make-and-break switch, and means adapting each armature to open and close the switch when the said electromagnet structure is properly energized.

34. In a relay device, a single electromagnet structure and a plurality of operable members therefor forming a substantially closed magnetic circuit under energized conditions, a switch under control of the said operable members, and means for causing the relay device to operate said operable members separately, when the said electromagnet structure is properly energized, whereby each opens and closes the switch.

35. In an electromagnetic device, a single electromagnet structure and a plurality of operable members therefor forming a substantially closed magnetic circuit under energized conditions, a switch under control of the said operable members, and means for causing the said magnet structure to operate the said operable members separately, when properly energized, whereby each controls the said switch.

36. A single electromagnet structure and a plurality of armatures therefor forming a substantially closed magnetic circuit under energized conditions, the said armatures being adapted to be operated separately by the said magnet structure, a make-and-break switch, and means adapting one of the said armatures to close the switch and another of the said armatures to open the switch, upon the proper energization of the said magnet structure.

37. In a relay device, the combination with a substantially U-shaped magnet structure having but a single core and a single winding for magnetizing the said structure, of switching mechanism, operable mechanism at the open end of the magnet structure adapted to be actuated thereby to control the said switching mechanism, and means for partially actuating the said operable mechanism at one time and completely actuating it at another time, upon the proper energization of the relay device, to exercise different controls over the switching mechanism.

38. In a relay device, the combination of a substantially U-shaped magnet structure having but a single core and a return magnetic member, energizing means on the said core, switching mechanism, operable mechanism at the open end of the magnet structure adapted to be actuated thereby to control the said switching mechanism, and means for partially actuating the said operable mechanism at one time and completely actuating it at another time, upon the proper energization of the relay device, to exercise different controls over the switching mechanism.

39. In a relay device, the combination with a substantially U-shaped magnet structure having but a single core and a single winding for magnetizing the said structure, of switching mechanism, operable mechanism at the open end of the magnet structure adapted to be operated thereby to control the said switching mechanism, and means for causing the said operable mechanism to assume two operative positions besides normal position, upon the proper energization of the relay device, to exercise different controls over the switching mechanism.

40. In a relay device, the combination of a substantially U-shaped magnet structure having but a single core and a return magnetic member, energizing means on the said core, switching mechanism, operable mechanism at the open end of the magnet structure adapted to be operated thereby to control the said switching mechanism, and means for causing the said operable mechanism to assume two operative positions besides normal position, upon the proper energization of the relay device, to exercise different controls over the switching mechanism.

41. In a relay, the combination with a substantially U-shaped magnet structure, of an angularly-shaped armature member pivoted between the ends thereof and having one arm extending in front of a pole of the magnet structure and adapted to be attracted thereto and the other arm extending rearwardly along the magnet structure, switch members disposed longitudinally of the said magnet structure and adapted to engage each other at points of contact near their forward ends, said points of contact being outside of said magnet structure and said rearwardly-extending arm of the armature member, the latter having means for operating at least one of the said switch members, the said means engaging the switch member which is operated thereby to the rear of the said point of contact thereof.

42. An electromagnet and a plurality of armatures therefor forming a substantially closed magnetic circuit under energized conditions, a switch under control of the armatures, and means for causing the magnet to operate the said armatures separately, upon different energizations of the magnet, whereby each armature controls the said switch.

43. A magnet and a plurality of armatures therefor forming a substantially closed magnetic circuit under energized conditions, a switch under control of the armatures, and means for causing the magnet to operate the said armatures separately, upon different energizations thereof, whereby each controls the said switch.

44. A magnet and a plurality of operable mechanisms therefor forming a substantially closed magnetic circuit under energized conditions, a switch under control of the mechanisms, and means for causing the magnet to operate the said mechanisms separately, upon different energizations thereof, whereby each controls the said switch.

45. An electromagnet having a substantially closed magnetic circuit under energized conditions, a switch, and means for causing the magnet to control the switch in different manners upon different energizations thereof.

As inventor of the foregoing I hereunto subscribe my name, this 15th day of March, 1920.

FREDERICK R. PARKER.

Witnesses:
FRANCES K. PARKER,
OTTO KISCHEL.